US012762078B2

(12) United States Patent
Oh et al.

(10) Patent No.: US 12,762,078 B2
(45) Date of Patent: Oct. 13, 2026

(54) MEMORY CONTROLLER COMMUNICATING WITH VERTICALLY STACKED DIES AND SEMICONDUCTOR DEVICE INCLUDING THE SAME

(71) Applicant: SAMSUNG ELECTRONICS CO., LTD., Suwon-si (KR)

(72) Inventors: Jihun Oh, Suwon-si (KR); Geonho Kim, Suwon-si (KR); Ilho Jung, Suwon-si (KR); Kyeongkeun Kang, Suwon-si (KR); Dongha Kim, Suwon-si (KR); Changyoung Bae, Suwon-si (KR); Kwanyeob Chae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/979,918

(22) Filed: Dec. 13, 2024

(65) Prior Publication Data

US 2025/0265210 A1 Aug. 21, 2025

(30) Foreign Application Priority Data

Feb. 21, 2024 (KR) ........................ 10-2024-0025307
May 2, 2024 (KR) ........................ 10-2024 0058671

(51) Int. Cl.
*G06F 13/38* (2006.01)
*G06F 13/16* (2006.01)

(52) U.S. Cl.
CPC ........ *G06F 13/387* (2013.01); *G06F 13/1689* (2013.01)

(58) Field of Classification Search
CPC ............. G06F 13/1673; G06F 13/1689; G06F 13/387; G06F 13/4059; G06F 13/4273; G06F 3/0629; G06F 3/0658; G06F 3/0661
See application file for complete search history.

(56) References Cited

U.S. PATENT DOCUMENTS 9,099,999 B1 8/2015 Wang et al.
9,818,680 B2 11/2017 Yazdani
(Continued)

FOREIGN PATENT DOCUMENTS

CN 115203097 A 10/2022
KR 10-2020-0065762 A 6/2020

OTHER PUBLICATIONS

Communication dated Jun. 16, 2025, issued by the European Patent Office in European Application No. 25153674.4.

*Primary Examiner* — Phong H Dang
(74) *Attorney, Agent, or Firm* — Sughrue Mion, PLLC

(57) ABSTRACT

A semiconductor device includes at least one core die and a logic die communicating with the core die via a plurality of through-silicon vias. The logic die includes a memory controller configured to control a memory operation of the core die and a PHY region configured to receive first input signals based on a first protocol from the memory controller and transmit first output signals generated based on the first input signals to the core die via the plurality of TSVs. The PHY region includes a protocol converter configured to perform alignment processing on bits of the first input signals so as to convert the protocol of the first input signals into a second protocol and then output the first input signals based on the second protocol, wherein the second protocol supports multi-phase communication between the PHY region and the core die.

20 Claims, 15 Drawing Sheets

(56) References Cited

U.S. PATENT DOCUMENTS

| | | | | |
|---|---|---|---|---|
| 10,067,689 | B1 | 9/2018 | Mng et al. | |
| 10,762,012 | B2 | 9/2020 | Lee | |
| 2003/0163606 | A1* | 8/2003 | Fukaishi | G11C 7/106 710/1 |
| 2008/0284037 | A1 | 11/2008 | Andry et al. | |
| 2015/0003477 | A1* | 1/2015 | Baeckler | H04L 25/14 370/503 |
| 2019/0179769 | A1* | 6/2019 | Keeth | G06F 13/28 |
| 2020/0142844 | A1* | 5/2020 | Chi | G06F 13/1689 |
| 2022/0190936 | A1* | 6/2022 | Jin | H04B 17/19 |
| 2022/0391285 | A1 | 12/2022 | Pawlowski | |
| 2023/0005904 | A1 | 1/2023 | Fay et al. | |
| 2023/0044654 | A1* | 2/2023 | Oh | G11C 7/1045 |
| 2025/0266067 | A1* | 8/2025 | Kim | G11C 7/1066 |

* cited by examiner

MEMORY CONTROLLER COMMUNICATING WITH VERTICALLY STACKED DIES AND SEMICONDUCTOR DEVICE INCLUDING THE SAME

CROSS-REFERENCE TO RELATED APPLICATION

This application is based on and claims priority under 35 U.S.C. § 119 to Korean Patent Application Nos. 10-2024-0025307, filed on Feb. 21, 2024, and 10-2024-0058671, filed on May 2, 2024, in the Korean Intellectual Property Office, the disclosures of which are incorporated by reference herein in their entireties.

BACKGROUND

This application is related to a memory controller, and more particularly, to a memory controller communicating with vertically stacked dies via through-silicon vias (TSVs) and a semiconductor device including the memory controller.

As an example of semiconductor devices, dynamic random access memory (DRAM) includes volatile memory that determines data on the basis of electric charges stored in a capacitor. As an example of DRAM, high-bandwidth memory (HBM), which provides input and output in a multi-channel interface, is used in various systems, such as graphics, servers, supercomputers, and networks that require high performance and low power. The HBM may have a structure in which a buffer die (or a base die) communicating with an external host and one or more core dies (or memory dies) including arrays of memory cells are stacked on each other.

In general, the HBM may be mounted on an interposer separately from an external host, and high-speed communication according to a certain interface may be performed between the external host and the HBM. However, latency in signal transmission and reception may increase significantly due to the high-speed communication through the interposer, and an increase in power consumption may occur due to the high-speed communication.

SUMMARY

Embodiments provide a memory controller and a semiconductor device including the memory controller, wherein core dies including memory cell arrays are stacked vertically on a logic die including a memory controller, and the logic die and the core dies communicate with each other via a through-silicon via (TSV). Accordingly, it is possible to prevent an increase in latency or power consumption caused by high-speed communication via an external interposer.

Provided herein is a semiconductor device including: at least one core die including a memory cell array; and a logic die communicating with the at least one core die via a plurality of through-silicon vias (TSVs), wherein the logic die includes: a memory controller configured to control a memory operation of the at least one core die; and a physical (PHY) region configured to receive first input signals based on a first protocol from the memory controller and transmit first output signals of a second protocol generated based on the first input signals to the at least one core die via the plurality of TSVs, wherein the PHY region includes a protocol converter configured to: perform alignment processing on first bits of the first input signals so as to convert the first input signals from the first protocol into the first output signals of the second protocol, and output the first output signals, wherein the second protocol is based on a multi-phase communication between the PHY region and the at least one core die.

Also provided herein is a semiconductor device including: at least one first die including a memory cell array; and a second die including: a memory controller configured to control a memory operation of the at least one first die, and a physical (PHY) region configured to communicate, based on a first protocol, with the memory controller and communicate, based on a second protocol, with the at least one first die via a plurality of through-silicon vias (TSVs), wherein the PHY region includes: a protocol converter configured to perform protocol conversion based on an alignment processing for rearranging first bits of a command/address provided from the memory controller; and first to N-th signal processing blocks configured to: process the rearranged bits of the command/address output from the protocol converter in synchronization with first to N-th internal clocks having multi-phases, and output the rearranged bits of the command/address having multi-phases, where N is an integer of two or more.

Also provided herein is a memory controller including: a memory control unit configured to control a memory operation of a memory device; and a physical (PHY) region configured to: receive first input signals based on a first protocol from the memory control unit, and transmit first output signals generated based on the first input signals to the memory device via a plurality of through-silicon vias (TSVs), wherein the PHY region includes: a protocol converter configured to: convert, based on alignment processing for rearranging bits of the first input signals, a protocol of the first input signals into a second protocol, and output the first input signals having the second protocol, wherein the second protocol is based on multi-phase communication between the PHY region and the memory device; and first to N-th signal processing blocks configured to: process the bits of the first input signals output from the protocol converter in synchronization with first to N-th internal clocks having multi-phases and generate the first output signals having multi-phases, wherein N is an integer of two or more.

BRIEF DESCRIPTION OF DRAWINGS

Embodiments will be more clearly understood from the following detailed description taken in conjunction with the accompanying drawings in which.

DETAILED DESCRIPTION

Hereinafter, embodiments are described in detail with reference to the accompanying drawings.

Figure 1:
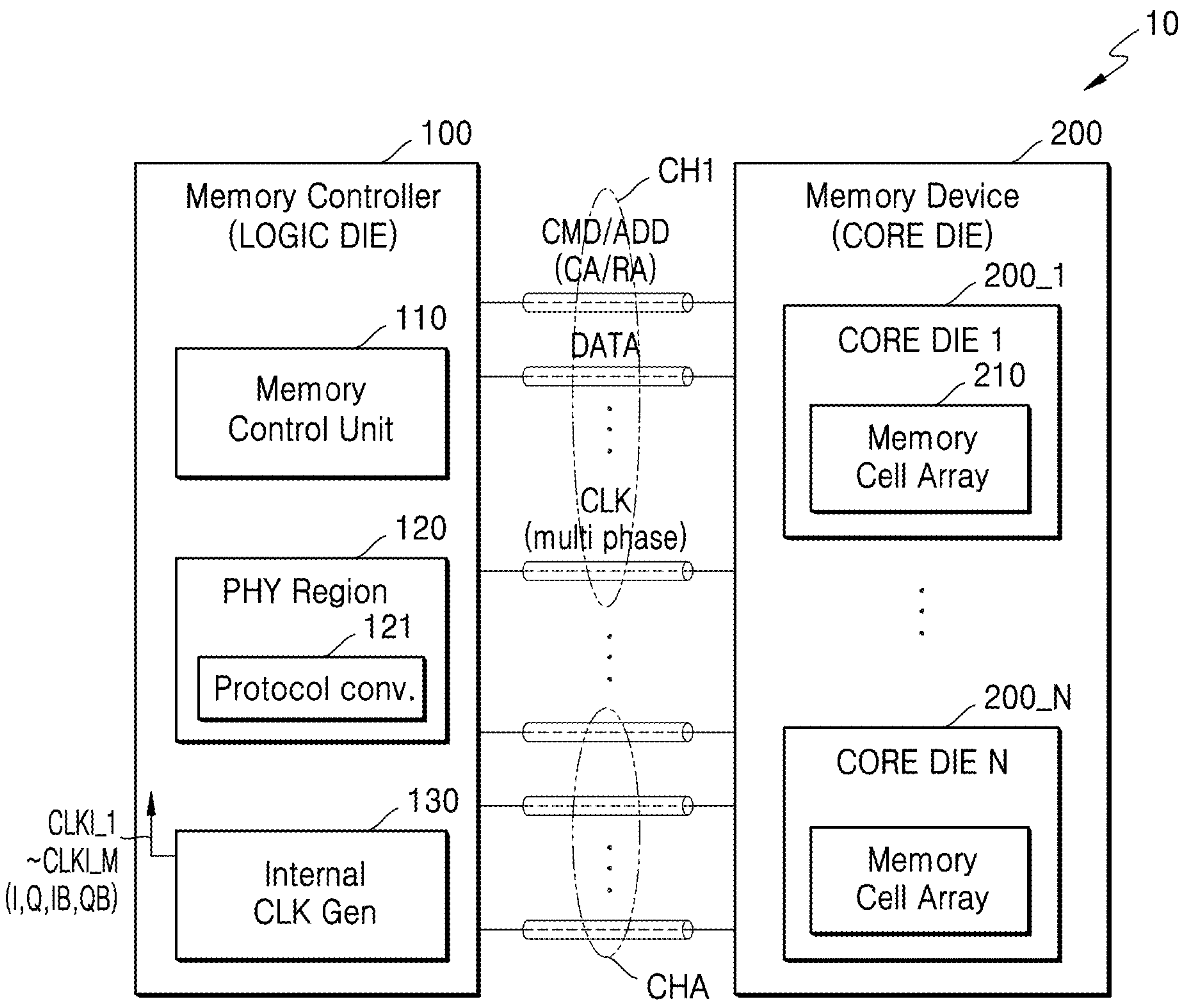
FIG. 1 is a block diagram showing a memory controller and a semiconductor device including the memory controller, according to an embodiment.

FIG. 1 is a block diagram showing a memory controller according to an embodiment and a semiconductor device 10 including the memory controller.

Referring to FIG. 1, the semiconductor device 10 may include a memory controller and a memory device 200. The memory controller may be provided as various forms, such as a semiconductor chip level or a semiconductor die (DIE) level and may be referred to as a logic die 100 in that the memory controller performs logic operations of controlling memory operations of the memory device 200. In an embodiment, the logic die 100 may include a memory control unit 110, a physical (PHY) region 120, and an internal clock generator 130. In the example of FIG. 1, the internal clock generator 130 for generating internal clocks having multi-phases is shown outside of the PHY region 120, but the internal clock generator 130 may be provided in the PHY region 120.

The memory device 200 may include one or more semiconductor chips or semiconductor dies having a stack structure. In the following embodiments, a memory device is described as including a plurality of core dies each including a memory cell array. The core die described above may also be referred to as a memory die in that the core die includes a memory cell array. Also, the semiconductor device 10 includes the memory controller and the memory device 200 and may thus correspond to a memory system. The memory system may be configured inside a personal computer (PC), a mobile electronic device, or a data server.

Referring to FIG. 1, the memory device 200 may include first to N-th core dies 200_1 to 200_N, the first core die 200_1 may include a memory cell array 210, and the memory cell array 210 may include a plurality of dynamic random access memory (DRAM) cells. However, the embodiments are not necessarily limited thereto, and the memory cell array 210 may also include other types of memory cells, such as resistive random access memory (RRAM) cells, ferroelectric random access memory (FRAM) cells, phase change random access memory (PRAM) cells, thyristor random access memory (TRAM) cells, magnetic random access memory (MRAM) cells, and flash memory cells. In addition, although not shown in FIG. 1, each of the first to N-th core dies 200_1 to 200_N may further include various peripheral circuits for controlling write and read operations of the memory cells.

The logic die 100 may control the memory operation of the memory device 200 on the basis of a request from an external host (not shown). For example, the logic die 100 may communicate with an external host on the basis of various interface protocols, such as peripheral component interconnect-express (PCI-E), advanced technology attachment (ATA), serial ATA (SATA), parallel ATA (PATA), and serial attached SCSI (SAS) and may provide the external host with results of access to the memory device 200.

In an embodiment, the logic die 100 may function as a host and internally generate a request to the memory device 200, and the memory control unit 110 may control the memory operation of the memory device 200 in response to the request. For example, the logic die 100 may include or correspond to an application specific integrated circuit (ASIC), a system on chip (SoC), an application processor (AP), a mobile AP, a chipset, etc. In addition, the logic die 100 may further include at least one of other components that perform a function of a host, such as a central processing unit (CPU), a graphics processing unit (GPU), a neural processing unit (NPU), an accelerated processing unit (APU), and a tensor processing unit (TPU).

Based on control by the memory control unit 110, the logic die 100 may provide command/address CMD/ADD, data DATA, and a clock signal CLK to the memory device 200 via the PHY region 120. For example, the command/address CMD/ADD may include a column address CA and a row address RA, and may provide write data to the memory device 200 or receive read data from the memory device 200. The clock signal CLK may include other types of signals. For example, the clock signal CLK may include a clock signal used by the memory device 200 to receive the command/address CMD/ADD or a clock signal used by the memory device 200 to receive the data DATA.

In an embodiment, the semiconductor device 10 may correspond to high bandwidth memory (HBM). In FIG. 1, for convenience of illustration, the logic die 100 and the first to N-th core dies 200_1 to 200_N are shown separately at different positions on the same plane. However, the first to N-th core dies 200_1 to 200_N may be vertically stacked in a three dimensional (3D) shape on the logic die 100, and the logic die 100 and the first to N-th core dies 200_1 to 200_N may communicate with each other via a through-silicon via (TSV) and/or a through-backside via (TBV). Also, each of the first to N-th core dies 200_1 to 200_N may include a plurality of channels that independently communicate with the logic die 100, and the TSV and/or TBV may be arranged so as to be physically distinct from each other for the plurality of channels. Referring to FIG. 1, when the memory device 200 includes first to A-th channels CH1 to CHA and each core die includes two channels, the A channels may correspond to 2*N channels. Also, when each core die includes 4 channels, the A channels may correspond to 4*N channels. In the following embodiments, it is assumed that the logic die 100 and the first to N-th core dies 200_1 to 200_N communicate with each other via TSVs.

An example operation of the semiconductor device 10 according to an embodiment is described below. In describing the example operation, a case is described, in which the command/address CMD/ADD, the data DATA, and the clock signal CLK are transmitted and received between the logic die 100 and the first channel CH1 of the first core die 200_1. However, in addition to the above-described signals, other types of signals may be transmitted and received therebetween.

As the semiconductor device 10 includes the HBM, the logic die 100 may transmit various signals to the first core die 200_1 via TSVs. In existing HBM, a buffer die is placed below core dies, and the buffer die communicates with a memory controller provided on an external logic chip via an interposer. On the other hand, according to the embodiment, a plurality of core dies are stacked directly on the logic die 100 that performs a memory control function. Therefore, an existing buffer die may not be provided in the semiconductor device 10 according to the embodiment. In addition, since the logic die 100 according to the embodiment directly communicates with the core dies, various circuits (e.g., TSV input/output (IO) circuits) provided in the buffer die of the existing HBM and used for communication via the TSVs may be provided in the PHY region 120 according to the embodiment.

In an embodiment, the logic die 100 may transmit various signals to the first core die 200_1 on the basis of a multi-phase method. For example, the internal clock generator 130 may generate a plurality (e.g., M) of internal clocks CLKI_1 to CLKI_M having different phases on the basis of a reference clock signal having an arbitrary frequency. For example, the internal clock generator 130 may generate four phase internal clocks I, Q, IB, and QB having phase differences of 90 degrees. The internal clocks CLKI_1 to CLKI_M may have a frequency lower than a clock frequency in a communication domain (e.g., a controller domain) between the memory control unit 110 and the PHY region 120. The logic die 100 may transmit the command/address CMD/ADD, the data DATA, and the clock signal CLK to the first core die 200_1 via the plurality of TSVs in synchronization with the internal clocks CLKI_1 to CLKI_M. In an embodiment, bits of the command/address CMD/ADD) and/or the data DATA may be output in the form of multi-phases. In addition, the clock signal CLK used by the first core die 200_1 to receive the command/address CMD/ADD and the data DATA may also have multi-phases.

The PHY region 120 may communicate with the memory control unit 110 according to a certain interface, such as a DDR PHY Interface (DFI), and the memory control unit 110 may provide the PHY region 120 with the command/address CMD/ADD and the data DATA having signal characteristics according to a certain protocol (e.g., a first protocol). The first protocol of signals provided by the memory control unit 110 may have characteristics suitable for generating signals for high-speed communication based on the Joint Electron Device Engineering Council (JEDEC) according to the related art. For example, the first protocol may have signal characteristics based on a double data rate (DDR) communication of the clock signal used in the controller domain.

Also, the PHY region 120 may transmit, to the core dies, the command/address CMD/ADD and the data DATA having signal characteristics according to a certain protocol (e.g., a second protocol). The second protocol may have characteristics suitable for performing multi phase-based communication.

In an example, the PHY region 120 may include a protocol converter 121. The protocol converter 121 may receive input signals including various signals having a first protocol from the memory control unit 110, perform protocol conversion processing on the received input signals, and output the input signals in which the protocol has been converted (or the input signals having the second protocol). The PHY region 120 may transmit output signals generated based on the above input signals to the first core die 200_1, and the output signals may be generated on the basis of the input signals having the second protocol described above.

The protocol converter 121 may perform a protocol conversion operation on bits of the command/address CMD/ADD and bits of the data DATA received from the memory control unit 110. For example, the protocol converter 121 may perform an alignment operation on the command/address CMD/ADD, such as changing and rearranging the order of bits of the command/address CMD/ADD provided from the memory control unit 110 and changing the cycle of the synchronized clock. Also, the protocol converter 121 may perform an alignment operation on the data DATA, such as changing and rearranging the order of bits of the data DATA provided from the memory control unit 110 and changing the cycle of the synchronized clock. In addition, the protocol converter 121 may perform an alignment operation on data (read data) provided from core dies. Through the above processing, the protocol converter 121 may determine the phase with which each of the bits of command/address CMD/ADD and the data DATA is synchronized. In describing the embodiments, it may be understood that the phase with which each bit is synchronized is determined based on the operation of rearranging the bits.

In addition, the protocol converter 121 may output signals for generating the clock signal CLK used to receive the command/address CMD/ADD and the data DATA on the basis of the signal provided from the memory control unit 110. The protocol converter 121 may further perform an alignment operation related thereto. In describing the following embodiments, the alignment processing performed by the protocol converter 121 may further include other operations in addition to the rearrangement operation described above. Also, the alignment processing performed by the protocol converter 121 in the embodiment may not be necessarily limited to specific types of operations.

According to the embodiment described above, there is no need to perform high-speed communication according to the JEDEC interface in communication between the logic die 100 and the core dies, and the logic die 100 may transmit various signals to the core dies via the TSV on the basis of a relatively low speed compared to the communication speed between the memory control unit 110 and the PHY region 120. Therefore, signal transmission and reception characteristics may be improved, and power consumption may be reduced. Also, the protocol of the signal in the controller domain is converted into the protocol of the signal in the TSV domain, and thus, communication between the logic die 100 and the core dies may be optimized. In addition, the buffer die is removed from the HBM, and thus, total resources may be reduced when constituting the memory system.

Figure 2A:
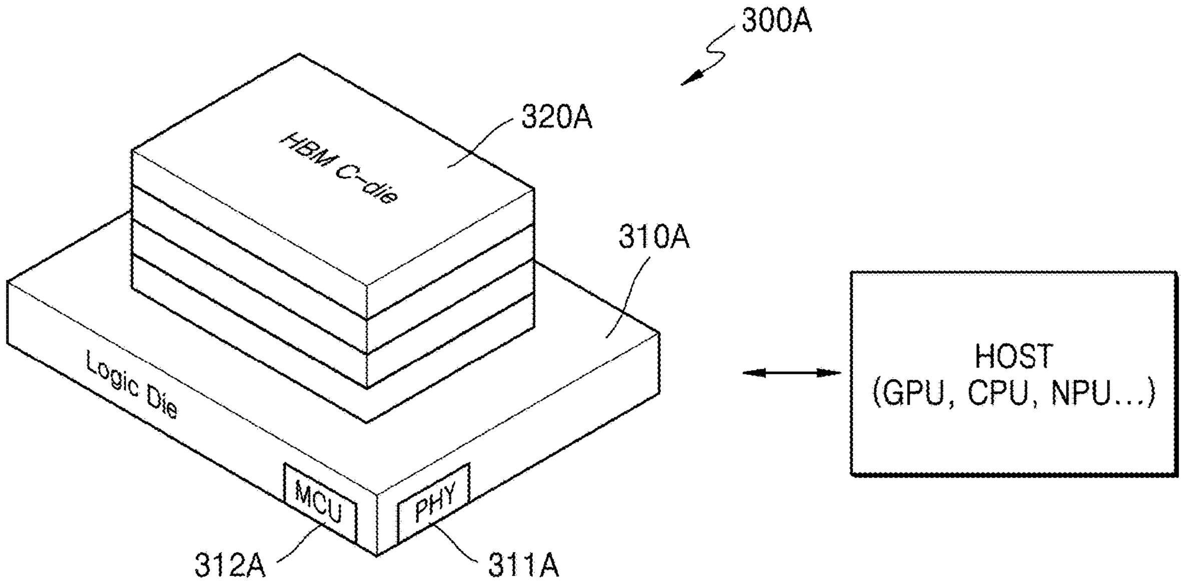
FIGS. 2A and 2B are diagrams showing an example in which a semiconductor device includes high-bandwidth memory (HBM), according to an embodiment.
Figure 2B:
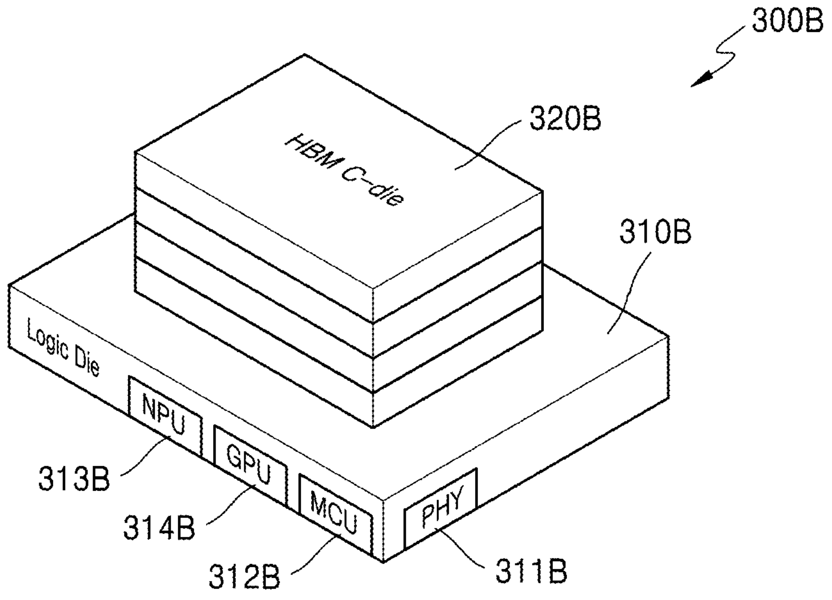

FIGS. 2A and 2B are diagrams showing an example in which a semiconductor device includes HBM, according to an embodiment.

Referring to FIG. 2A, a semiconductor device 300A according to the embodiments may include HBM. Specifically, the semiconductor device 300A may include HBM in which a plurality of dies are stacked. For example, the semiconductor device 300A may include a logic die 310A and a plurality of core dies (e.g., HBM core dies 320A (or simply referred to as core dies 320A) stacked in a 3D shape on the logic die 310A. The logic die 310A may itself function as a host or may control memory operations of the plurality of core dies 320A in response to requests from an external host. For example, the external host may include a CPU, a GPU, an NPU, an APU, an AP, etc. Although not shown in FIG. 2A, the logic die 310A may be electrically connected to a printed circuit board (PCB) via a plurality of bumps or connection terminals, and the semiconductor device 300A may be provided as a semiconductor package including the PCB.

The logic die 310A may include a PHY region 311A and a memory control unit 312A and may transmit various signals to the plurality of core dies 320A by controlling the memory operations of the plurality of core dies 320A. For example, the PHY region 311A may perform various processing operations related to communication between the memory control unit 312A and the core dies 320A. For example, since the PHY region 311A includes the protocol converter (not shown) according to the embodiment described above, the PHY region 311A may perform a protocol conversion operation on signals received from the memory control unit 312A on the basis of the controller domain, and may generate signals on the basis of the TSV domain and transmit the generated signals to the plurality of core dies 320A.

Also, referring to FIG. 2B, a semiconductor device 300B may include a logic die 310B and a plurality of core dies 320B stacked on the logic die 310B, and the logic die 310B may include a PHY region 311B and a memory control unit 312B. In addition, the logic die 310B performs the function of a host and may thus include other processing devices, such as an NPU 313B and the GPU 314B. Although not shown in FIG. 2B, various other types of processing devices that provide request for data access may be further provided in the logic die 310B.

When the HBM is provided as the structures shown in FIGS. 2A and 2B above, and especially when the logic die includes processing devices, such as the NPU and the GPU, which operate at high performance, heat generation from the logic die may increase. According to the embodiment, the logic die may perform protocol conversion optimized for communication based on multi-phase clock signals and perform communication with the core dies based on a relatively low frequency, thereby reducing the heat generated by the logic die.

Figure 3:
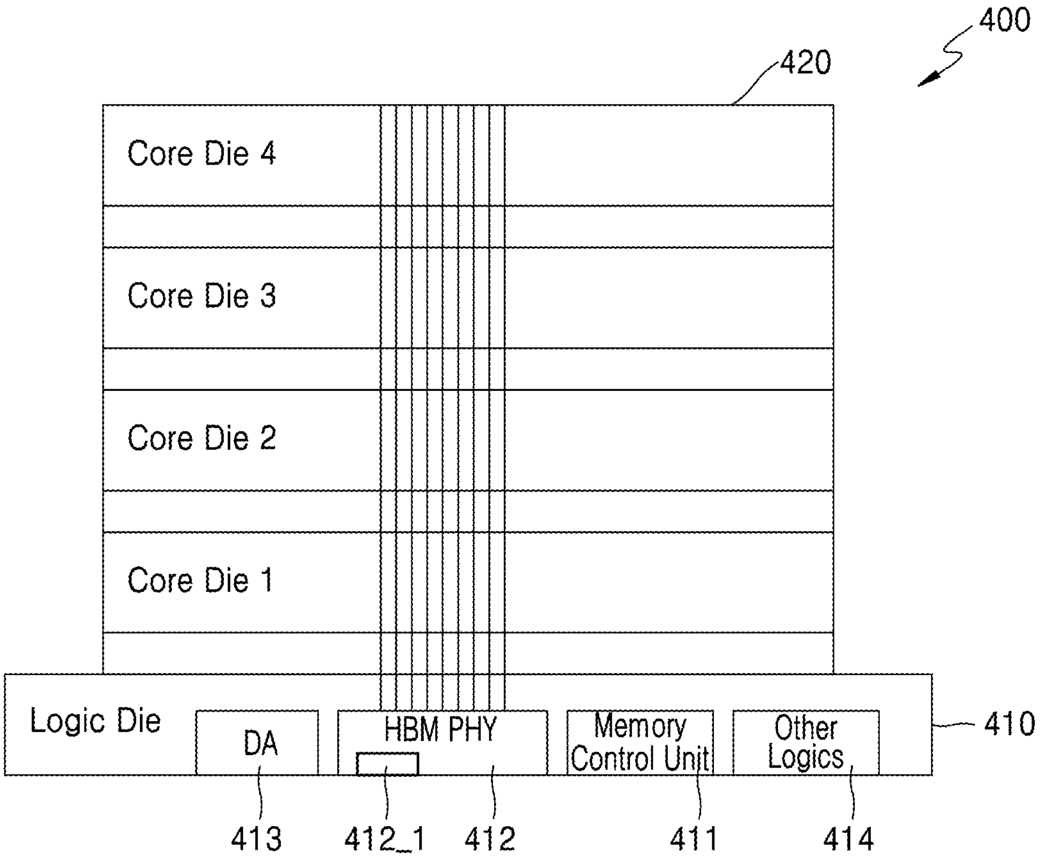
FIG. 3 shows a cross-sectional view showing an example of HBM according to an embodiment.

FIG. 3 shows a cross-sectional view showing an example of HBM according to an embodiment.

Referring to FIG. 3, as the semiconductor device according to the embodiment, HBM 400 may include a logic die 410 and a plurality of core dies. Also, FIG. 3 illustrates a case in which first to fourth core dies 420 are stacked on the logic die 410.

The logic die 410 may include a memory control unit 411, an HBM PHY region 412, a direct access region 413, and other logics 414. The memory control unit 411 may generate a command/address to control memory operations in response to requests from hosts inside or outside the HBM 400. The HBM PHY region 412 may include a plurality of TSVs, and the command/address, data, and various clock signals may be transmitted to the first to fourth core dies 420 via the HBM PHY region 412. In addition, the HBM PHY region 412 controls communication between the controller domain and the TSV domain between the memory control unit 411 and the first to fourth core dies 420 and may thus include a protocol converter 412_1 according to the embodiment described above. The direct access region 413 may perform a function of directly communicating with test equipment outside the HBM 400 in a test mode for the HBM 400. For example, various signals provided from external test equipment may be provided to the first to fourth core dies 420 via the direct access region 413 and the HBM PHY region 412.

Also, the other logics 414 may include other types of logic circuits applicable to the HBM 400. For example, the logic die 410 functions as a host, and thus, the other logics 414 may include other processing devices, such as a CPU, a GPU, an APU, and an NPU. In addition, the logic die 410 may communicate with an external semiconductor chip (or a semiconductor die), and thus, the other logics 414 may include a universal chiplet interconnect express (UCIe) module for supporting interface protocols between semiconductor chips or semiconductor dies, etc.

Figure 4A:
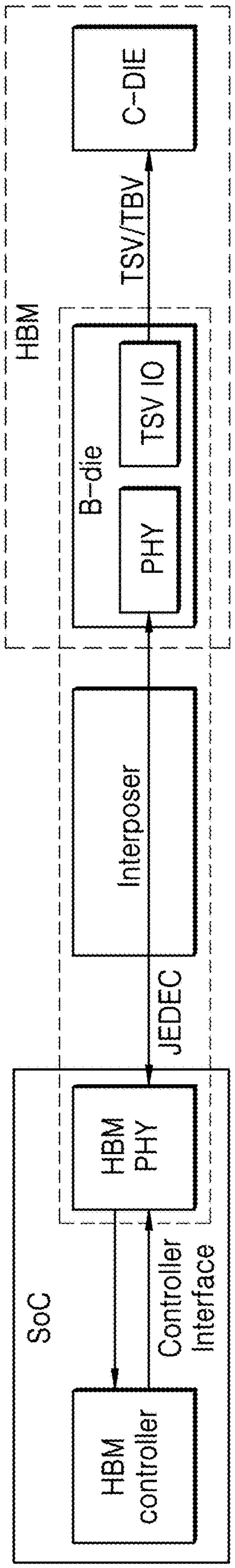
FIGS. 4A and 4B are diagrams schematically showing examples of communication between a logic die and a core die.
Figure 4B:
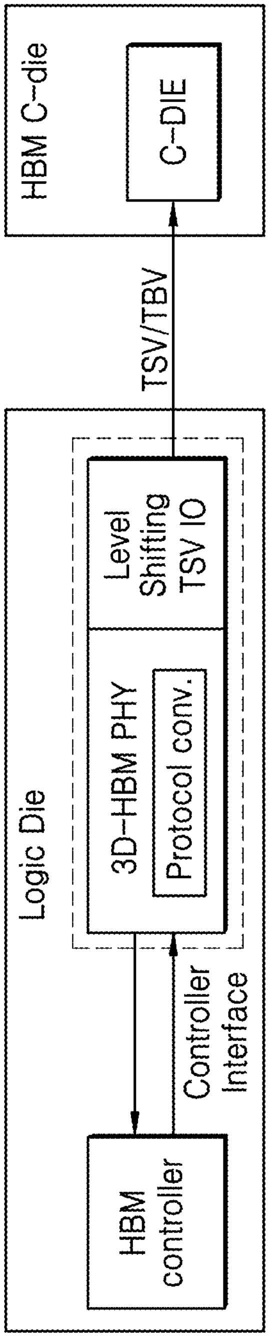

FIGS. 4A and 4B are diagrams schematically showing examples of communication between a logic die and a core die. FIG. 4A illustrates a case in which an SoC and HBM communicate with each other via an interposer according to the existing method. FIG. 4B illustrates communication between a logic die and a core die when a plurality of core dies are stacked in a 3D structure on the logic die according to the embodiment.

Referring to FIG. 4A, an SoC or processing units, such as a CPU and a GPU, as a host provided with a memory controller, may be mounted on an interposer separately from the HBM. Assuming that an SoC and one or more HBMs are mounted on an interposer in a system including an existing HBM, the SoC may include an HBM controller and an HBM PHY region, and the HBM controller and the HBM PHY region may communicate command/address and data according to a certain controller interface, such as a DFI. In addition, the HBM PHY region of the SoC may communicate with a PHY region provided in a buffer die of HBM via an interposer. For example, the SoC may communicate the command/address and data with the HBM on the basis of high-speed communication according to the JEDEC interface. The buffer die of the HBM may transmit the command/address and data to a plurality of core dies stacked thereon via TSVs and may include a TSV IO circuit for signal transmission via the TSVs.

However, in a structure in which a plurality of core dies are stacked directly on a logic die according to the embodiment shown in FIG. 4B, there is no need to perform high-speed communication based on the JEDEC interface via an interposer when transmitting command/address and data to the core dies. In addition, the buffer die may be removed from the existing HBM structure, or a portion of the buffer die may be integrated into the logic die according to the embodiment. The logic die may include the HBM controller and the HBM PHY region, and the plurality of core dies may be stacked in a 3D structure on the logic die. Accordingly, the HBM PHY region of the logic die may be referred to as a 3D-HBM PHY region. Also, the HBM controller and the HBM PHY region may communicate the command/address and data according to a certain interface, such as the DFI described above.

The HBM PHY region of the logic die may include a protocol converter according to the embodiment described above, and the logic die may communicate with the plurality of core dies via the TSVs. Accordingly, the HBM PHY region may include a TSV IO circuit. In addition, in order to convert the voltage level in the controller domain to the voltage level in the TSV domain, the TSV IO circuit may perform a level shifting function to adjust the voltage level of command/address and data transmitted via the TSVs.

Hereinafter, examples of protocol conversion according to embodiments are described. As described above, the PHY region of the logic die may communicate with the memory control unit on the basis of the first protocol, communicate with the core dies on the basis of the second protocol, and perform protocol conversion operations on various signals. For example, the protocol converter according to the embodiment may perform an alignment operation on bits of command/address and data, but the scopes of embodiments are not necessarily limited to specific types of signals and specific operations.

FIGS. 5 to 9 are diagrams showing specific examples and operations of a logic die according to embodiments.

Figure 5:
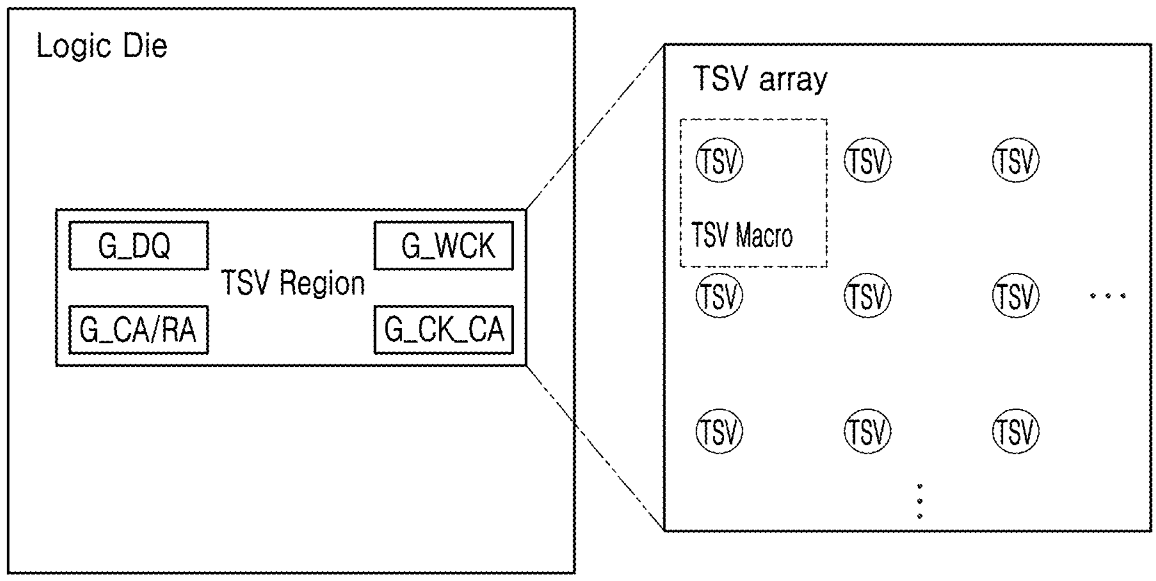
FIGS. 5 to 11 are diagrams showing specific examples and operations of a logic die according to embodiments.

FIG. 5 shows an example of a TSV region in a PHY region of the logic die, and the TSV region may include a plurality of TSVs arranged in an array form. Also, since the plurality of TSVs are arranged in an array form, a certain space may exist between the TSVs. A TSV macro may be defined corresponding to one or more TSVs, and the TSV macro may represent a set of circuits related to processing signals transmitted and received via the TSVs or may refer to a region in which theses circuits are placed. In addition to the above term, the TSV macro may also be referred to as a TSV slice or TSV circuit block. In addition, the TSV macro may be defined as a configuration that includes a corresponding TSV or may be defined as a configuration that includes circuits related thereto without including a corresponding TSV.

A plurality of TSVs may be classified into a plurality of groups depending on the types of signals transmitted or received by the plurality of TSVs. For example, a data group G_DQ may include TSVs for transmitting write data or receiving read data, and a command/address group G_CA/

RA may include TSVs for transmitting a column address CA and a row address RA. In addition, a write clock group G_WCK may include TSVs for delivering a write clock WCK used by the core die to receive the data, and a CA clock group G_CK_CA may include TSVs for delivering a clock (hereinafter, referred to as a CA clock) used by the core die to receive the command/address. In an embodiment, the data, command/address, and clock signals transmitted to the core dies may have multi-phases. Accordingly, the plurality of TSVs in each of the groups may transmit signals having different phases.

Figure 6:
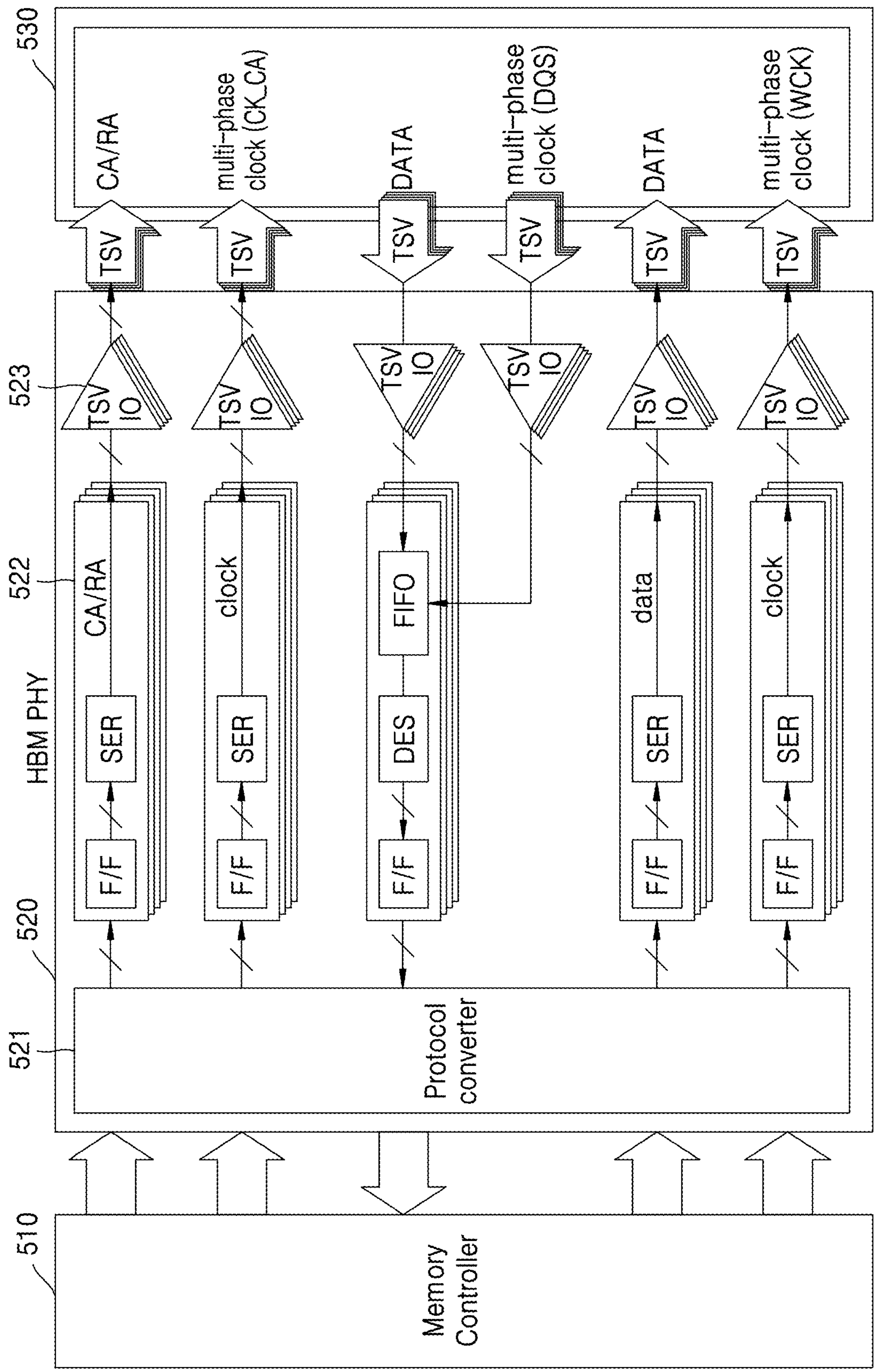

FIG. 6 illustrates an example of a memory system according to an embodiment.

Referring to FIG. 6, a memory system 500 may include a logic die and a core die 530, and the logic die may include a memory control unit (or a memory controller 510) and an HBM PHY region 520. Also, the HBM PHY region 520 may include a protocol converter 521, a signal processing block 522, and a TSV IO circuit 523, and the HBM PHY region 520 may communicate with the core die 530 via a plurality of TSVs. In an embodiment, the signal processing block 522 and the TSV IO circuit 523 may be arranged for operations related to processing various signals. For example, a plurality of signal processing blocks 522 and TSV IO circuits 523 for operations related to processing a column/row address CA/RA, data DATA, and multi-phase clock signals may be provided in the HBM PHY region 520. In addition, each of the signal processing blocks 522 may include other types of circuits depending on the signals being processed. For example, the signal processing block 522 may be configured to include at least one of a flip-flop, a serializer, a deserializer, a first in first out (FIFO) circuit, and various other circuits.

The memory controller 510 may provide the protocol converter 521 with various signals according to a first protocol in a controller domain and the protocol converter 521 may convert the protocol of the received signals into a second protocol suitable for communication with the core die 530 in a TSV domain. For example, the signals provided from the memory controller 510 may have the first protocol suitable for generating signals based on the existing JEDEC interface, and the protocol converter 521 may generate the signals having the second protocol suitable for multi phase-based communication on the basis of the protocol conversion operation. For example, the protocol converter 521 may perform alignment processing, such as changing and rearranging the order of bits for the column/row address CA/RA and data DATA or changing the cycle of a synchronized clock. Also, the protocol converter 521 may perform alignment processing during the process of outputting signals used to generate various multi-phase clock signals.

The signal processing block 522 provided in the HBM PHY region 520 may perform signal processing on the basis of an internal clock having multi-phases with a relatively low frequency. Also, the HBM PHY region 520 may transmit a column/row address CA/RA and a CA clock CK_CA having multi-phases synchronized with the column/row address CA/RA to the core die 530 via the TSV IO circuit 523. Also, the HBM PHY region 520 may transmit data DATA and a write clock WCK having multi-phases synchronized with the data DATA to the core die 530 via the TSV IO circuit 523. In addition, the HBM PHY region 520 may receive data DATA and a clock (e.g., a strobe signal DQS) having multi-phases synchronized with the data DATA from the core die 530 via the TSV IO circuit 523.

Referring to the example of the signal processing on the column/row address CA/RA, the protocol converter 521 may perform alignment processing on bits of the column/row address CA/RA provided from the memory controller 510. Assuming that the signal is processed based on four-phase internal clocks, the protocol converter 521 may allocate bits of one or more column/row addresses CA/RA to each of the phases and may thus output the column/row addresses CA/RA of four bits or bits in multiples of four in parallel. The signal processing block 522 may include first to fourth signal processing blocks that operate in synchronization with the four-phase internal clocks, and the first to fourth signal processing blocks may generate output signals sequentially having phase differences of 90 degrees.

Each of the signal processing blocks 522 may include one or more flip-flops and a serializer. For example, when two bits of the column/row address CA/RA are provided in parallel to each of the signal processing blocks 522, bits from two flip-flops may be provided in parallel to the serializer. The serializer may sequentially output the bits of the column/row address CA/RA one by one to the TSV IO circuit 523. The TSV IO circuit 523 may also include first to fourth TSV IO circuits corresponding to four-phase internal clocks, and the bits of column/row address CA/RA having four phases may be transmitted to the core die 530 via the first to fourth TSV IO circuits. The serializer may be implemented by logic hardware such as flip-flops, and gates and or gates.

Similarly, with respect to data to be transmitted to the core die 530, four signal processing blocks may be arranged corresponding to the four-phase internal clocks, and the bits of the data DATA from the protocol converter 521 may be transmitted to the core die 530 via the flip-flop and the serializer. Also, the data received from the core die 530 may be provided to the protocol converter 521 via the FIFO circuit, the deserializer, and the flip-flop, and the protocol converter 521 may perform protocol conversion processing on the bits of the data DATA and then output the data DATA to the memory controller 510. Also, with respect to the multi-phase clock signals, the signal processing blocks 522 may receive various signals from the protocol converter 521 and output the received signals via the flip-flop and the serializer. In addition, the multi-phase clock signals used to receive the above-described column/row address CA/RA and data DATA may be generated by a signal processing operation in synchronization with the four-phase internal clocks. The deserializer may be implemented by logic hardware such as flip-flops, and gates and or gates FIG. 7 shows a specific example of a protocol conversion operation according to an embodiment.

Figure 7:
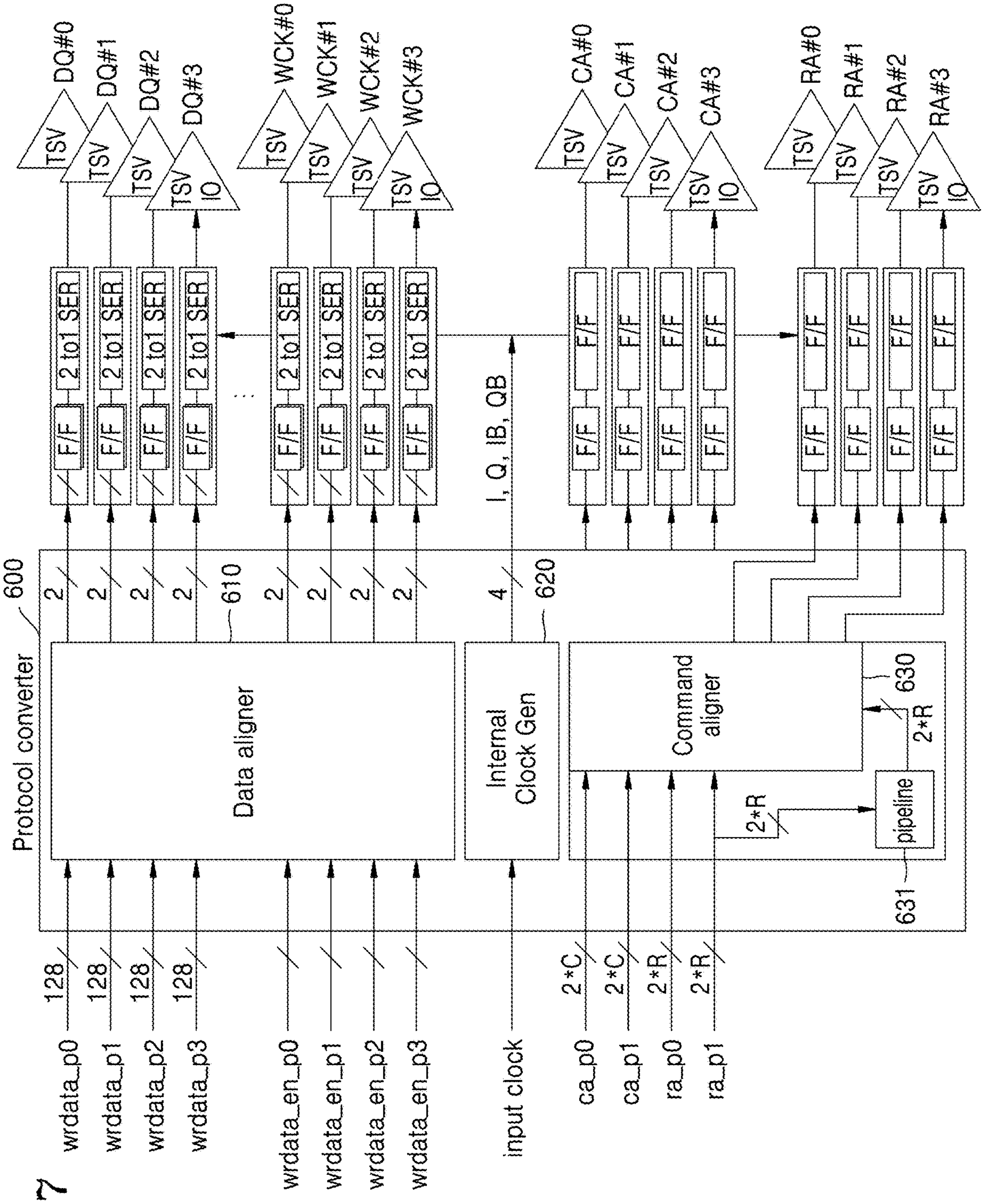

Referring to FIG. 7, a protocol converter 600 provided in an HBM PHY region of a logic die may include a data aligner 610, an internal clock generator 620, a command aligner 630, and a delay 631. In the embodiment shown in FIG. 7, a pipeline is illustrated as an example of the delay 631. However, the embodiment is not necessarily limited thereto, and the delay 631 may be provided as various forms.

A memory controller (not shown) provided in the logic die may provide signals having a protocol based on an existing interface (e.g., a DFI interface) to the HBM PHY region. For example, the memory controller may provide first to fourth write data wrdata_p0 to p3 and first to fourth data enable signals wrdata_en_p0 to p3 corresponding thereto. In an embodiment, each of the first to fourth write data wrdata_p0 to p3 has 128 bits. However, the embodiment is not necessarily limited thereto, and the number of bits of the data enable signal corresponding to each write data may be equal to or less than the number of bits of the write data.

The data aligner 610 may perform alignment processing on the received first to fourth write data wrdata_p0 to p3 and first to fourth data enable signals wrdata_en_p0 to p3. For example, with respect to the first to fourth write data wrdata_p0 to p3, the data aligner 610 may allocate and output two bits of data to each of the four phase internal clocks I, Q, IB, and QB on the basis of the rearrangement operation, and 2-bit data may be provided in parallel to the corresponding signal processing block. The 2-bit data may be output to the TSV IO circuit via a flip-flop and a 2 to 1 serializer inside the signal processing block. The four signal processing blocks may output the bits of data in synchronization with the four phase internal clocks I, Q, IB, and QB having phase differences of 90 degrees. Accordingly, pieces of data DQ #0 to DQ #3 output via the TSV IO circuit may have multi-phases having phase differences of 90 degrees.

Also, with respect to the first to fourth data enable signals wrdata_en_p0 to p3, the data aligner 610 may allocate and output 2-bit data enable signals to each of the four phase internal clocks I, Q, IB, and QB. The 2-bit data enable signals may also be provided in parallel to the corresponding signal processing block, and each of the signal processing blocks may process the input data enable signals to generate and output a write clock WCK. Since the four signal processing blocks that process the data enable signals may operate in synchronization with the four phase internal clocks I, Q, IB, and QB, write clocks WCK #0 to WCK #3 output via the TSV IO circuit may have multi-phases having phase differences of 90 degrees. Also, the core die may receive the data DQ #0 to DQ #3 in synchronization with the write clocks WCK #0 to WCK #3.

Herein, the internal clock generator 620 may generate four phase internal clocks I, Q, IB, and QB on the basis of a certain input clock, and the four phase internal clocks I, Q, IB, and QB may be provided to circuits (e.g., circuits, such as serializers and flip-flops) that generate outputs in the signal processing blocks.

Also, the command aligner 630 may perform alignment processing on first and second column addresses ca_p0 and p1 and first and second row addresses ra_p0 and p1, as command/addresses provided from the memory controller. For example, as a protocol based on the DFI interface, each of the first and second column addresses ca_p0 and p1 may have a value of 2*C bits (C is an integer of 2 or more), and the command aligner 630 may allocate and output a 1-bit column address to each of the four phase internal clocks I, Q, IB, and QB. Similarly, each of the first and second row addresses ra_p0 and p1 provided to the command aligner 630 may have a value of 2*R bits (R is an integer of 2 or more), and the command aligner 630 may allocate and output a 1-bit row address to each of the four phase internal clocks I, Q, IB, and QB. The signal processing blocks that process the first and second column addresses ca_p0 and p1 and the first and second row addresses ra_p0 and p1 may also operate in synchronization with the four phase internal clocks I, Q, IB, and QB. Therefore, column addresses CA #0 to CA #3 output via the TSV IO circuit may have multi-phases with phase differences of 90 degrees, and row addresses RA #0 to RA #3 may also have multi-phases with phase differences of 90 degrees. Overall, the signal processing blocks 522, the data aligner 610, the internal clock generator 620 and the command aligner 630 may be implemented with hardware logic include and gates, or gates, inverters, counters and phase locked loops. Memories storing instructions executed by hardware processors may also be used. Finally custom hardware such as ASICs may be used.

Also, the delay 631 may perform delay processing on some bits of the command/address and output the delayed bits to the command aligner 630, and the command aligner 630 may perform alignment processing using the delayed bits. In the embodiment shown in FIG. 7, a case is illustrated in which delay processing is performed on the second row address ra_p1. For example, if a specific signal (e.g., the second row address ra_p1) is provided to the HBM PHY region as early as one cycle of a clock according to the communication protocol in the controller domain, the delay may be applied to the second row address ra_p1 when performing protocol conversion to the TSV domain.

Also, various circuits shown in FIGS. 6 and 7 may be provided in the TSV macro described in the above embodiment. In an embodiment, some of the plurality of TSV macros may correspond to the TSVs for transmitting the data and may include at least some of flip-flops, serializers, deserializers, and FIFO circuits. Also, other portions of the plurality of TSV macros may correspond to the TSVs for transmitting the command/address and may include circuits, such as flip-flops and serializers.

In addition, the data aligner 610 and the command aligner 630 (see FIG. 7) may be implemented identically or similarly to each other. As illustrated in FIG. 7, the data aligner 610 receives the first to fourth write data (wrdata_p0 to p3) each including 128 bits, and allocates and outputs 2 bits of data for each of I, Q, IB, and QB. To this end, the data aligner 610 may include features (e.g., a plurality of pipelines) for controlling the reception and transmission timing of the first to fourth write data (wrdata_p0 to p3), and features (e.g., a plurality of multiplexers) for selecting 2 bits of data provided to each of I, Q, IB, and QB.

Also, the first to fourth write data (wrdata_p0 to p3) can be provided to each flip-flop (F/F) by the aligning operation. As an example, one or more multiplexers can be arranged corresponding to each flip-flop and the multiplexers can receive the first to fourth write data (wrdata_p0 to p3) and output them to the corresponding flip-flop.

Thus data aligner 610 is capable of allocating the first to fourth write data (wrdata_p0 to p3) to each flip-flop by including a plurality of pipelines and a plurality of multiplexers. A similar description applies to the command aligner 630.

Herein, in the embodiment shown in FIG. 7, a case is illustrated in which one bit column/row address is provided to each of the signal processing blocks that process the command/address. However, as in the example shown in FIG. 6, 2 or more bit column/row addresses are provided in parallel to each of the signal processing blocks, and each of the signal processing blocks may be configured to include a serializer.

Figure 8:
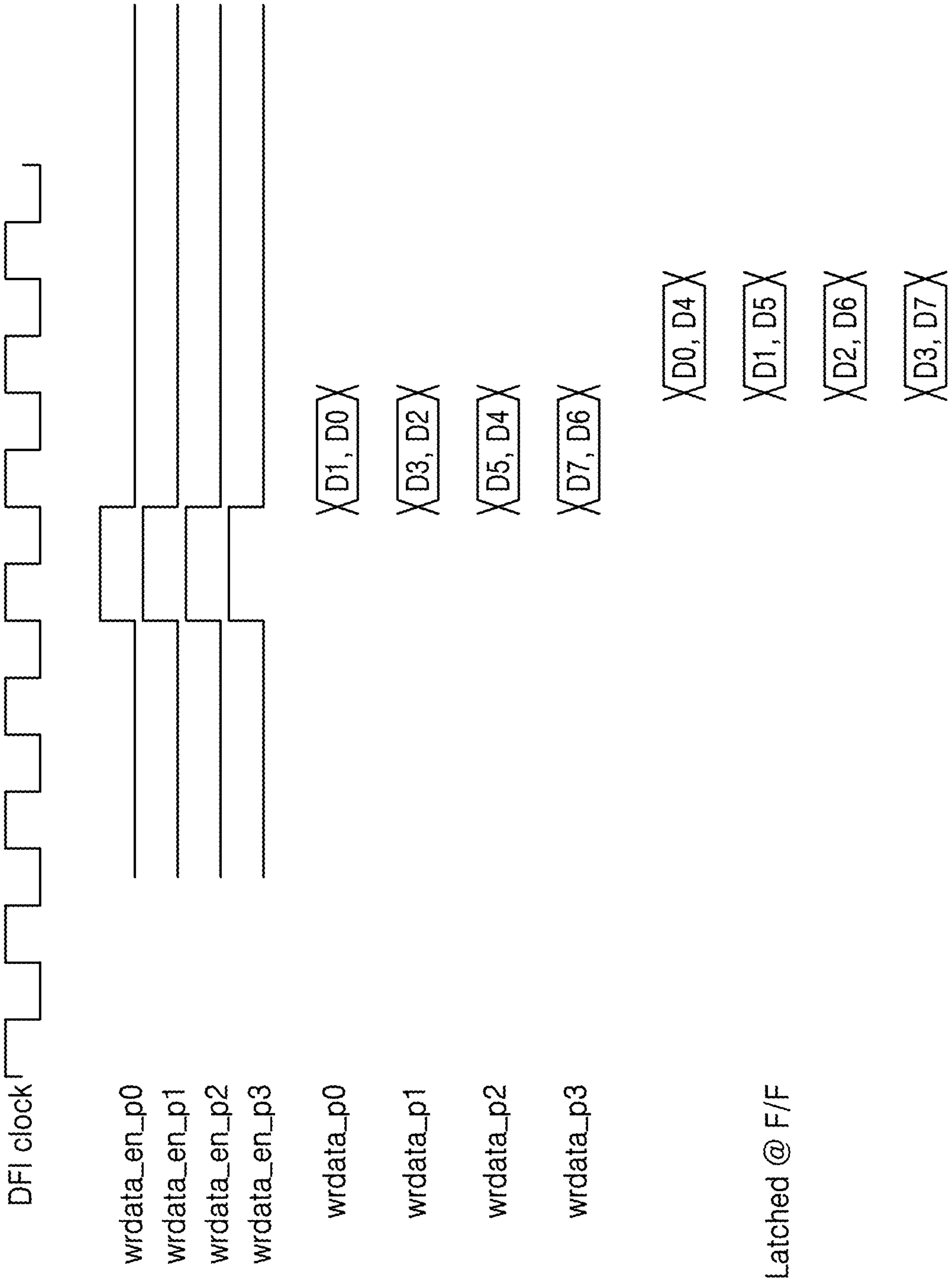
Figure 9:
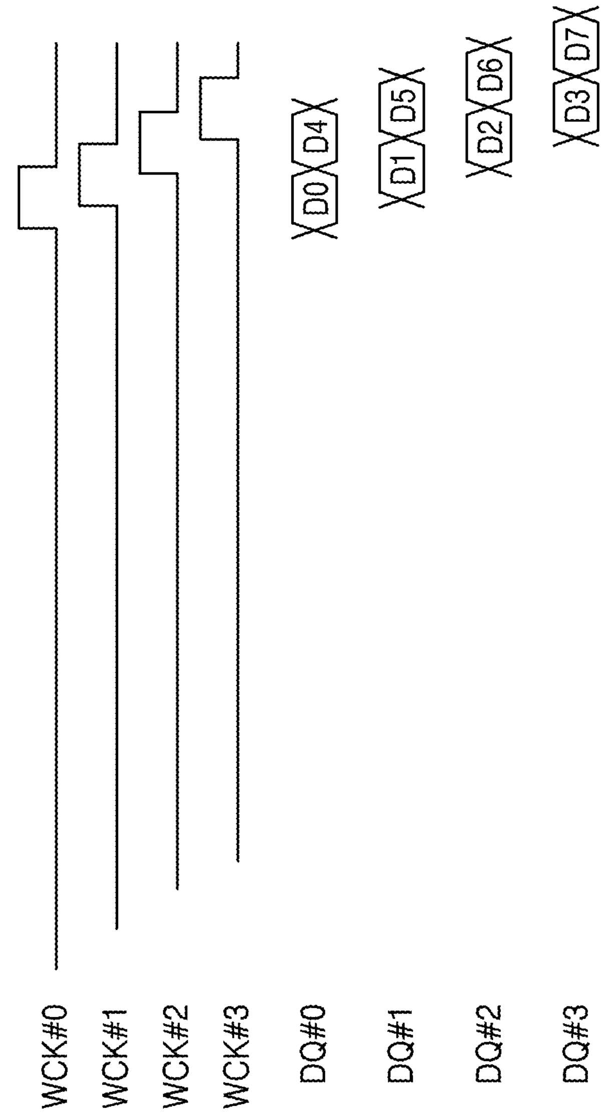

FIGS. 8 to 11 are waveform diagrams showing an example operation of the PHY region of the logic die shown in FIG. 7. In the example of FIGS. 8 and 9, only some pieces of multi-bit write data and data enable signals in FIG. 7 are illustrated. Also, in the example of FIGS. 10 and 11, only some pieces of multi-bit column/row addresses in FIG. 7 are illustrated.

Referring to FIGS. 7 to 9, the HBM PHY region may receive the first to fourth data enable signals wrdata_en_p0 to p3 from the memory controller in synchronization with a certain clock signal DFI clock. Also, the HBM PHY region may receive the first to fourth write data wrdata_p0 to p3 after a certain period of time has elapsed (for example, after one cycle of the clock signal DFI clock) when receiving the data enable signal. In one example operation, the first to fourth write data wrdata_p0 to p3 may be received in synchronization with the rising/falling edges of the clock signal DFI clock on the basis of a DDR method. The first write data wrdata_p0 may include first and second data D0 and D1, the second write data wrdata_p1 may include third and fourth data D2 and D3, the third write data wrdata_p2 may include fifth and sixth data D4 and D5, and the fourth write data wrdata_p3 may include seventh and eighth data D6 and D7.

The data aligner 610 according to embodiments may perform alignment processing on the received first to fourth write data wrdata_p0 to p3. For example, the first to eighth data D0 to D7 provided from the memory controller may have a protocol such that the first to eighth data D0 to D7 are sequentially transmitted to the core die on the basis of the existing JEDEC interface, and the data aligner 610 may perform a protocol conversion operation so that the first to eighth data D0 to D7 are sequentially transmitted to the core die on the basis of multi-phase clock signals. For example, as shown in FIG. 8, based on the alignment processing by the data aligner 610, the first and fifth data D0 and D4 may be stored in flip-flops of a signal processing block that operates in synchronization with a first internal clock having a phase of 0 degrees, the second and sixth data D0 and D5 may be stored in flip-flops of a signal processing block that operates in synchronization with a second internal clock having a phase of 90 degrees, the third and seventh data D2 and D6 may be stored in flip-flops of a signal processing block that operates in synchronization with a third internal clock having a phase of 180 degrees, and the fourth and eighth data D3 and D7 may be stored in flip-flops of a signal processing block that operates in synchronization with a fourth internal clock having a phase of 270 degrees.

Also, FIG. 9 illustrates the data DQ #0 to DQ #3 and the write clocks WCK #0 to WCK #3 output to the core die via the TSV IO circuit. According to the above-described embodiment, the write clocks WCK #0 to WCK #3 may be generated on the basis of the first to fourth data enable signals wrdata_en_p0 to p3. The core die may receive the data DQ #0 to DQ #3 in synchronization with the write clocks WCK #0 to WCK #3. As shown in FIG. 9, the first to eighth data D0 to D7 may be transmitted from the logic die to the core die on the basis of the multi-phases.

Figure 10:
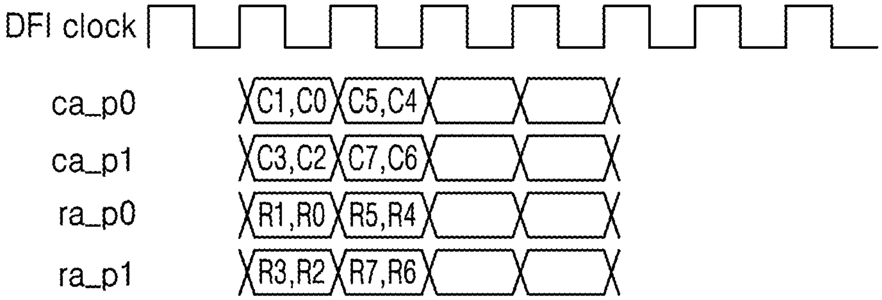
Figure 11:
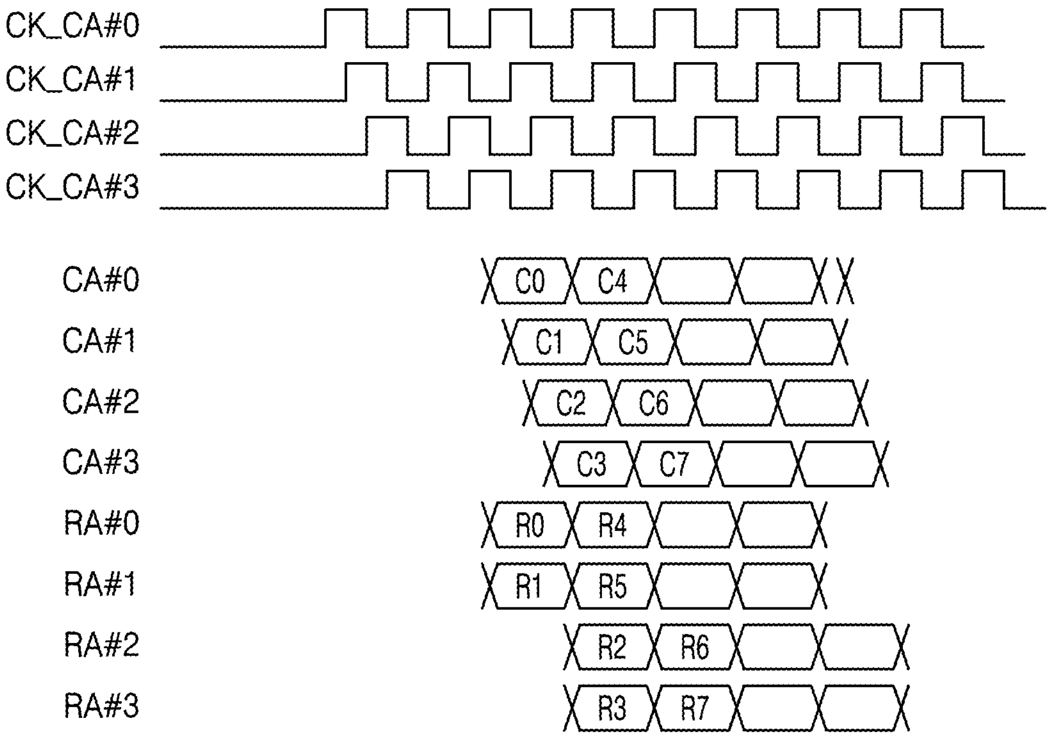

FIGS. 10 and 11 illustrate examples of protocol conversion for column/row addresses CA/RA according to an embodiment.

FIG. 10 shows a case in which an HBM PHY region receives first and second column addresses ca_p0 and p1 and first and second row addresses ra_p0 and p1 in synchronization with a certain clock signal DFI clock from the memory controller. For example, the first column address ca_p0 may include first, second, fifth, and sixth column signals C0, C1, C4, and C5 and the second column address ca_p1 may include third, fourth, seventh, and eighth column signals C2, C3, C6, and C7. Also, the first row address ra_p0 may include first, second, fifth, and sixth row signals R0, R1, R4, and R5 and the second row address ra_p1 may include third, fourth, seventh, and eighth row signals R2, R3, R6, and R7.

The command aligner 630 may perform alignment processing on the received first and second column addresses ca_p0 and p1 and first and second row addresses ra_p0 and p1. For example, the first and second column addresses ca_p0 and p1 and the first and second row addresses ra_p0 and p1 provided from the memory controller may have a protocol in which the first to eighth column signals C0 to C7 and the first to eighth row signals R0 to R7 are sequentially transmitted to the core die on the basis of the existing JEDEC interface. The command aligner 630 may perform a protocol conversion operation so that the first to eighth column signals C0 to C7 and the first to eighth row signals R0 to R7 are sequentially transmitted to the core die on the basis of the multi-phase clock signals.

FIG. 11 shows example waveforms of column/row addresses and CA clocks output to the core die.

Referring to FIG. 11, the HBM PHY region of the logic die may output the column addresses CA #0 to CA #3 and the row addresses RA #0 to RA #3 to the core die and may also output, to the core die, CA clocks CK_CA #0 to CK_CA #3 that are synchronized with the column addresses CA #0 to CA #3 and the row addresses RA #0 to RA #3. On the basis of the alignment processing by the command aligner 630, a column signal and a row signal to be synchronized with each of the CA clocks CK_CA #0 to CK_CA #3 may be determined. For example, as shown in FIG. 11, the first and fifth column signals C0 and C4 may be output in synchronization with the same CA clock, the second and sixth column signals C1 and C5 may be output in synchronization with the same CA clock, the third and seventh column signals C2 and C6 may be output in synchronization with the same CA clock, and the fourth and eighth column signals C3 and C7 may be output in synchronization with the same CA clock. Also, the first to fourth column signals C0 to C3 may be respectively and sequentially synchronized with the four CA clocks CK_CA #0 to CK_CA #3 (or referred to as first to fourth CA clocks CK_CA #0 to CK_CA #3) and transmitted to the core die.

In an embodiment, the logic die may transmit signals based on various types of waveforms to the core die on the basis of the communication protocol with the core die. For example, according to a predefined protocol, the logic die may transmit the row addresses RA #0 to RA #3 to the core die in synchronization with a specific CA clock, and the protocol converter in the embodiment described above may perform various types of signal conversion processing so as to comply with the predefined protocol. For example, as shown in FIG. 11, the first and second row signals R0 and R1 may be transmitted to the core die in synchronization with the edge of the first CA clock CK_CA #0. On the basis of delays, such as pipeline processing or flip-flop processing, the third and fourth row signals R2 and R3 may be transmitted to the core die in synchronization with the next edge of the first CA clock CK_CA #0.

Also, the CA clocks CK_CA #0 to CK_CA #3 may be generated on the basis of various methods in the logic die. In an example, the CA clocks CK_CA #0 to CK_CA #3 related to transmitting the command/address may be generated according to the same or similar method as the write clocks WCK #0 to WCK #3 described above. For example, the command aligner 630 may align at least some bits of the first and second column addresses ca_p0 and p1 and the first and second row addresses ra_p0 and p1 and output the at least some aligned bits thereof to the signal processing block, and the CA clocks CK_CA #0 to CK_CA #3 may be generated by processing in the same or similar signal processing block as the generation of the write clocks WCK #0 to WCK #3.

Figure 12:
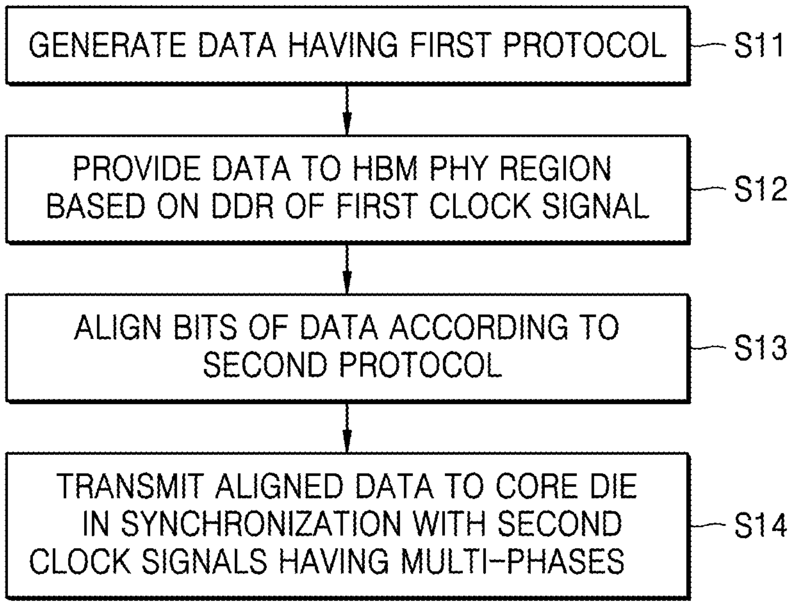
FIG. 12 is a flowchart showing a method of operating a logic die, according to an embodiment.

FIG. 12 is a flowchart showing a method of operating a logic die, according to an embodiment. FIG. 12 illustrates an example in which the logic die transmits data to a core die, but the embodiment of FIG. 12 may also be applied to the command/address described above.

Referring to FIG. 12, a semiconductor device may include HBM, the HBM may include a logic die and a plurality of core dies that are vertically stacked in a 3D shape, and the logic die and the plurality of core dies may communicate various signals via a TSV. Also, the logic die may include a memory controller (or a memory control unit) and an HBM PHY region, and the HBM PHY region may communicate with the memory controller in a controller domain. In addition, the HBM PHY region may communicate with the plurality of core dies in a TSV domain.

The memory controller of the logic die may generate the command/address to control the memory operation of the core die and generate data to be provided to the core die during a data write operation. The data may have a first protocol based on an interface, such as DFI (S11). The memory controller and the HBM PHY region may transmit and receive the data on the basis of a first clock signal. For example, the memory controller may provide the data to the HBM PHY region on the basis of a DDR method of the first clock signal (S12).

The HBM PHY region includes the protocol converter according to the embodiments described above and may thus align bits of the data according to a second protocol (S13). Also, the bits of the data to be synchronized with each of the clock signals having multi-phases may be determined on the basis of the alignment operation. In addition, the HBM PHY region may transmit the aligned data to the core die in synchronization with second clock signals having multi-phases, such as the write clock (S14). In an embodiment, the frequency of each of the second clock signals may be lower than the frequency of the first clock signal.

Figure 13:
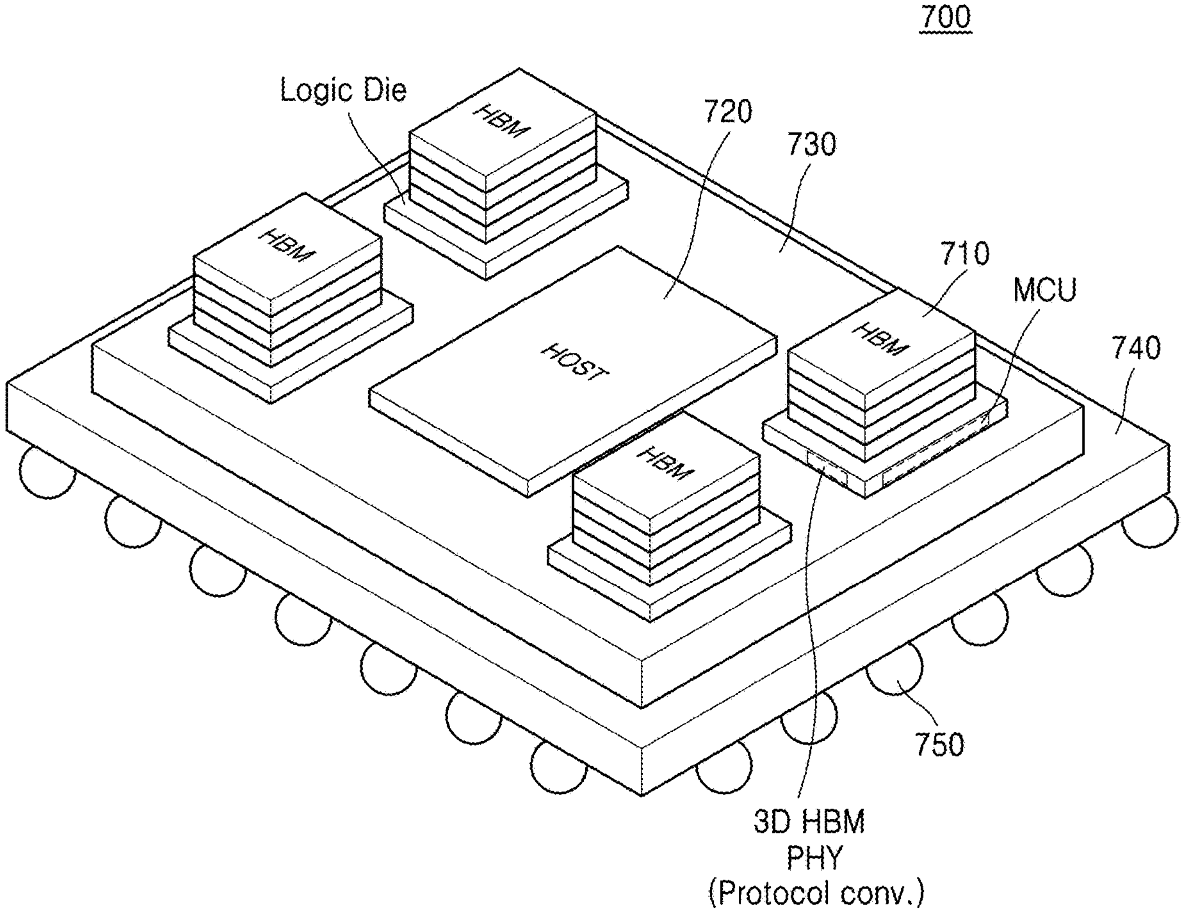
FIG. 13 is a structural diagram showing an example of an electronic system including a semiconductor device according to embodiments.

FIG. 13 is a structural diagram showing an example of an electronic system 700 including a semiconductor device according to embodiments.

Referring to FIG. 13, the electronic system 700 may include one or more HBMs 710 and a host 720 according to embodiments. The HBMs 710 and the host 720 may be mounted on an interposer 730, and the interposer 730 equipped with the HBMs 710 and the host 720 may be mounted on a package substrate 740. The host 720 may correspond to various semiconductor devices that request memory access.

Each of the HBMs 710 may be provided as a semiconductor device according to the embodiments described above, and thus, the HBM 710 may include a logic die and a plurality of core dies stacked thereon. In addition, according to embodiments, the logic die may include a memory control unit MCU and a 3D HBM PHY region. The 3D HBM PHY region may include a protocol converter, and the protocol converter may perform protocol conversion operations on various signals, such as the data and command/address, so that these various signals are suitable for signal processing based on multi-phases. Also, when the HBM 710 includes a direct access (DA) region, a test signal may be provided into the HBM 710 via the DA region and a conductive means (e.g., a solder ball 750) mounted on the lower portion of the package substrate 740. The interposer 730 may be provided as various structures, such as a silicon (TSV) type, an organic type in a PCB form, and an embedded multi-die interconnect bridge (EMIB) in a non-TSV form.

Various changes in form and details may be made without departing from the spirit and scope of the following claims.

What is claimed is:

1. A semiconductor device comprising:

at least one core die comprising a memory cell array; and a logic die communicating with the at least one core die via a plurality of through-silicon vias (TSVs), wherein the logic die comprises:

a memory controller configured to control a memory operation of the at least one core die; and a physical (PHY) region configured to receive first input signals based on a first protocol from the memory controller, generate first output signals of a second protocol based on the first input signals, and transmit the first output signals to the at least one core die via the plurality of TSVs, wherein the PHY region comprises:

a protocol converter configured to perform alignment processing on first bits of the first input signals so as to convert the first input signals from the first protocol into the first output signals of the second protocol; and a plurality of signal processing blocks configured to process the first output signals in parallel and in synchronization with respective phases of a plurality of internal clocks having multi-phases, and wherein the second protocol is based on a multi-phase communication between the PHY region and the at least one core die.

2. The semiconductor device of claim 1, wherein the first input signals comprise a first plurality of bits of write data, and the first output signals comprise the write data having multi-phases, and wherein the protocol converter is configured to perform a rearrangement operation on the first plurality of bits of the write data to communicate one or more bits of the write data using the multi-phases.

3. The semiconductor device of claim 2, wherein the plurality of internal clocks comprises first to fourth internal clocks, and wherein the PHY region is configured to sequentially transmit first to fourth pieces of write data respectively based on four phases to the plurality of TSVs in synchronization with the first to fourth internal clocks having phase differences of 90 degrees.

4. The semiconductor device of claim 3, wherein the plurality of signal processing blocks comprises first to fourth signal processing blocks configured to respectively output the first to fourth pieces of write data in synchronization with the first to fourth internal clocks, and wherein the protocol converter is further configured to output the one or more bits of the write data to each of the first to fourth signal processing blocks to determine a phase with which a plurality of bits of the write data are to be synchronized.

5. The semiconductor device of claim 4, wherein each of the first to fourth signal processing blocks comprises:

a plurality of flip-flops configured to receive, from the protocol converter, two or more bits of the write data in parallel; and a serializer configured to receive the two or more bits from the plurality of flip-flops and sequentially output one bit at a time.

6. The semiconductor device of claim 4, wherein the first input signals further comprise second bits of a data enable signal, and the first output signals further comprise first to fourth write clocks having four phases used by the at least one core die to receive the write data, wherein the plurality of signal processing blocks are configured to output the first to fourth write clocks in synchronization with the first to fourth internal clocks, and wherein the protocol converter is further configured to:

rearrange the second bits of the data enable signal, and output one or more bits of the data enable signal to each of the plurality of signal processing blocks to enable clocking by a respective one of the first to fourth write clocks.

7. The semiconductor device of claim 1, wherein the first input signals comprise a second plurality of bits of a command/address, and the first output signals comprise the command/address having multi-phases, and wherein the protocol converter is configured to perform a rearrangement operation on the second plurality of bits to communicate one or more bits of the second plurality of bits using the multi-phases.

8. The semiconductor device of claim 7, wherein the plurality of internal clocks comprise first to fourth internal clocks, and wherein the plurality of signal processing blocks comprise first to fourth signal processing blocks configured to output first to fourth commands/addresses having four phases in synchronization with the first to fourth internal clocks having phase differences of 90 degrees, wherein the protocol converter is further configured to output one or more bits of the command/address to each of the first to fourth signal processing blocks, and wherein the one or more bits of the command/address determine a phase with which the second plurality of bits of the command/address are to be synchronized.

9. The semiconductor device of claim 1, wherein the memory controller and the PHY region are configured to communicate the first input signals in synchronization with a first clock signal, and wherein the first protocol comprises a protocol based on a double data rate (DDR) communication using the first clock signal.

10. The semiconductor device of claim 1, wherein the at least one core die comprises a plurality of core dies, and wherein the semiconductor device comprises a high-bandwidth memory (HBM) in which the plurality of core dies are vertically stacked above the logic die.

11. A semiconductor device comprising:

at least one first die comprising a memory cell array; and a second die comprising:

a memory controller configured to control a memory operation of the at least one first die, and a physical (PHY) region configured to communicate, based on a first protocol, with the memory controller and communicate, based on a second protocol, with the at least one first die via a plurality of through-silicon vias (TSVs), wherein the PHY region comprises:

a protocol converter configured to perform protocol conversion based on an alignment processing for rearranging first bits of a command/address provided from the memory controller; and first to N-th signal processing blocks configured to:

process the rearranged bits of the command/address output from the protocol converter in synchronization with first to N-th internal clocks having multi-phases, and output the rearranged bits of the command/address having multi-phases, where N is an integer of two or more.

12. The semiconductor device of claim 11, wherein the protocol converter is further configured to determine, based on changing an order of bits of the command/address provided from the memory controller, a phase with which the bits of the command/address are to be synchronized.

13. The semiconductor device of claim 11, wherein the first to N-th signal processing blocks comprise first to fourth signal processing blocks configured to output first to fourth commands/addresses having multi-phases in synchronization with first to fourth internal clocks having phase differences of 90 degrees.

14. The semiconductor device of claim 13, wherein the command/address comprises column addresses and row addresses, and the protocol converter receives, from the memory controller, the column addresses of four times a first integer of bits and the row addresses of four times a second integer of bits in parallel, wherein the first integer and the second integer are each of value two or more, wherein the first to fourth signal processing blocks are configured to:

process the column addresses, and process the row addresses, and wherein, based on the alignment processing, the protocol converter is further configured to:

output the column addresses in parallel to the first to fourth signal processing blocks, wherein the first to fourth signal processing blocks are configured to process the column addresses in units of four bits, and output the row addresses in parallel to the first to fourth signal processing blocks, wherein the first to fourth signal processing blocks are configured to process the row addresses in units of four bits.

15. The semiconductor device of claim 11, wherein the PHY region further comprises first to N-th TSV input/output circuits arranged corresponding to the first to N-th signal processing blocks, respectively, and configured to transmit the command/address having multi-phases to the plurality of TSVs.

16. The semiconductor device of claim 11, wherein the protocol converter is further configured to perform the alignment processing for rearranging the first bits provided from the memory controller, and wherein the PHY region further comprises signal processing blocks for data, wherein the signal processing blocks are arranged corresponding to the data, the signal processing blocks are configured to:

process second bits of the data in synchronization with the first to N-th internal clocks, and output the data having multi-phases.

17. The semiconductor device of claim 16, wherein the PHY region is further configured to receive the second bits of the data from the memory controller in synchronization with a first clock signal, and wherein the first protocol comprises a protocol based on a double data rate (DDR) communication using the first clock signal.

18. A memory controller comprising:

a memory control unit configured to control a memory operation of a memory device; and a physical (PHY) region configured to:

receive first input signals based on a first protocol from the memory control unit, and transmit first output signals generated based on the first input signals to the memory device via a plurality of through-silicon vias (TSVs), wherein the PHY region comprises:

a protocol converter configured to:

convert, based on alignment processing for rearranging bits of the first input signals, a protocol of the first input signals into a second protocol, and output the first input signals having the second protocol, wherein the second protocol is based on multi-phase communication between the PHY region and the memory device; and first to N-th signal processing blocks configured to:

process the bits of the first input signals output from the protocol converter in synchronization with first to N-th internal clocks having multi-phases, and generate the first output signals having multi-phases, wherein N is an integer of two or more.

19. The memory controller of claim 18, wherein the first input signals comprise a plurality of bits of write data, and the first output signals comprise write data having multi-phases, and wherein, based on the alignment processing, the protocol converter is further configured to output one or more bits of the write data to each of the first to N-th signal processing blocks, wherein the one or more bits of the write data determine a phase with which the plurality of bits of the write data are to be synchronized.

20. The memory controller of claim 18, wherein the first input signals comprise a plurality of bits of a command/address, and the first output signals comprise the command/address having multi-phases, and wherein, based on the alignment processing, the protocol converter is further configured to output one or more bits of the command/address to each of the first to N-th signal processing blocks, wherein the one or more bits of the command/address determine a phase with which the plurality of bits of the command/address are to be synchronized.

* * * * *